US008897979B2

(12) United States Patent
Hebbale et al.

(10) Patent No.: US 8,897,979 B2
(45) Date of Patent: Nov. 25, 2014

(54) THERMAL MODEL FOR DRY DUAL CLUTCH TRANSMISSIONS

(75) Inventors: Kumaraswamy V. Hebbale, Troy, MI (US); Farzad Samie, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 535 days.

(21) Appl. No.: 13/104,109

(22) Filed: May 10, 2011

(65) Prior Publication Data
US 2012/0290249 A1    Nov. 15, 2012

(51) Int. Cl.
F16D 21/00    (2006.01)
F16H 61/688   (2006.01)
F16D 48/06    (2006.01)
F16D 21/06    (2006.01)
F16H 59/72    (2006.01)

(52) U.S. Cl.
CPC ............. *F16H 61/688* (2013.01); *F16D 48/06* (2013.01); *F16D 2021/0615* (2013.01); *F16D 2500/1066* (2013.01); *F16D 2500/1086* (2013.01); *F16D 2500/30405* (2013.01); *F16D 2500/3122* (2013.01); *F16H 2059/725* (2013.01)
USPC ............................................. 701/67; 701/68

(58) Field of Classification Search
CPC .............. F16D 2500/30405; F16D 2500/3122; F16H 2059/725
USPC ....................................................... 701/67, 68
See application file for complete search history.

(56) References Cited

U.S. PATENT DOCUMENTS

| 4,651,142    | A  * | 3/1987  | Klatt ............................. 340/453 |
| 6,006,149    | A  * | 12/1999 | Salecker et al. ................ 701/51 |
| 6,959,239    | B2 * | 10/2005 | Williams et al. ................ 701/55 |
| 7,329,205    | B2 * | 2/2008  | Preisner et al. ................. 477/80 |
| 2002/0191671 | A1 * | 12/2002 | Ferrell et al. .................. 374/141 |
| 2005/0045437 | A1 * | 3/2005  | Phillips et al. ............ 188/264 R |
| 2005/0130800 | A1 * | 6/2005  | Rieger et al. .................. 477/174 |
| 2009/0125286 | A1 * | 5/2009  | Waltz ................................. 703/5 |
| 2010/0113216 | A1 * | 5/2010  | Avny et al. ...................... 477/76 |
| 2011/0024258 | A1 * | 2/2011  | Avny et al. ...................... 701/68 |
| 2011/0257838 | A1 * | 10/2011 | Olsson et al. ................... 701/35 |

FOREIGN PATENT DOCUMENTS

| DE | 102007053706 A1 | 5/2009 |
| DE | 102009041412 A1 | 4/2010 |
| WO |   2010040624 A1 | 4/2010 |

* cited by examiner

*Primary Examiner* — Helal A Algahaim
*Assistant Examiner* — Donald J Wallace
(74) *Attorney, Agent, or Firm* — Quinn Law Group, PLLC

(57) ABSTRACT

A method of determining temperatures for a dry dual clutch mechanism includes one or more steps, such as determining a first heat input from a first clutch and determining a second heat input from a second clutch. The second clutch is separated from the first clutch by a center plate. The method also includes determining a housing air temperature of housing air within a bell housing case of the dry dual clutch mechanism. A thermal model is applied with the determined first heat input and second heat input. The thermal model includes temperature states for at least the first clutch, the second clutch, and the center plate. From the thermal model, the method determines at least a first clutch temperature and a second clutch temperature. The method includes executing a control action with the determined first clutch temperature and second clutch temperature.

10 Claims, 3 Drawing Sheets

=== PAGE 1 ===

THERMAL MODEL FOR DRY DUAL CLUTCH TRANSMISSIONS

TECHNICAL FIELD

This disclosure relates to thermal modeling to determine clutch temperatures in dry dual clutch transmissions.

BACKGROUND

Motorized vehicles use dual clutch transmissions to combine some of the features of both manual and automatic transmissions. Dual clutch transmissions use two clutches to shift between sets of gears within the same transmission, operating with some of the characteristics of both manual and conventional automatic transmissions. Some dual clutch transmissions use oil-bathed wet multi-plate clutches, and some use dry clutches without oil or fluid.

SUMMARY

A method of determining temperatures for a dry dual clutch mechanism is provided. The method includes one or more steps, such as determining a first heat input from a first clutch and determining a second heat input from a second clutch. The second clutch is separated from the first clutch by a center plate. The method also includes determining a housing air temperature of housing air within a bell housing case of the dry dual clutch mechanism.

A thermal model is applied with the determined first heat input and second heat input. The thermal model includes temperature states for at least the first clutch, the second clutch, and the center plate. From the thermal model, the method determines at least a first clutch temperature and a second clutch temperature. The method includes executing a control action with the determined first clutch temperature and second clutch temperature.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
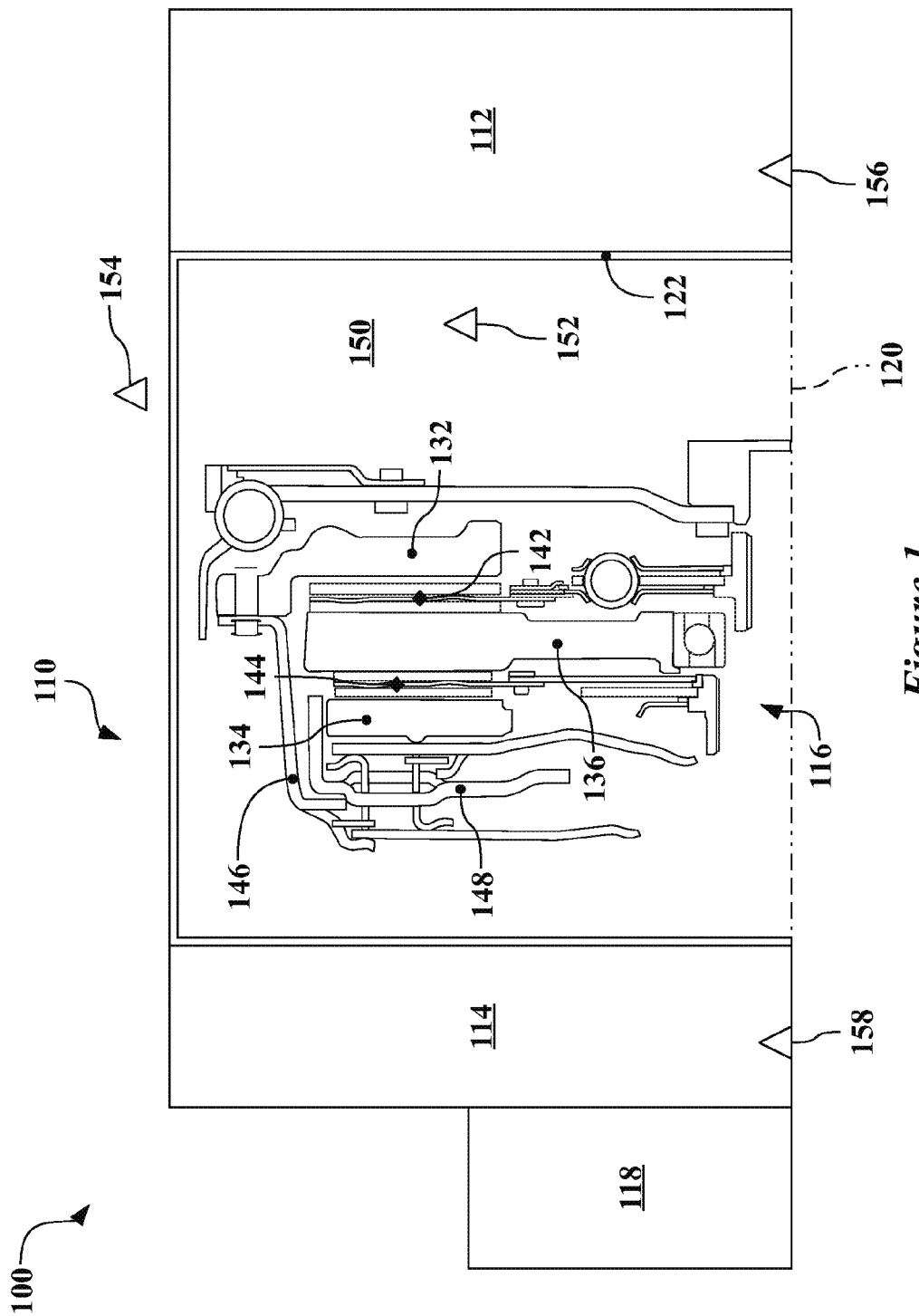
FIG. 1 is a schematic plane intersection view of a powertrain having an illustrative dry dual clutch transmission usable with thermal models described herein.

Referring to the drawings, wherein like reference numbers correspond to like or similar components whenever possible throughout the several figures, there is shown in FIG. 1 a schematic diagram of a powertrain 100. The powertrain 100 may be incorporated into a hybrid vehicle (not shown) or a conventional vehicle (not shown). Features, components, or methods shown or described in other figures may be incorporated and used with those shown in FIG. 1.

While the present invention is described in detail with respect to automotive applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims.

The powertrain 100 includes a dry dual clutch transmission 110, which may be referred to herein as the dry DCT 110 and receives power from an internal combustion engine 112. The dry DCT 110 includes a transmission gearbox 114 and dual clutch mechanism 116. The engine 112 is drivingly connected for powerflow communication with the dry DCT 110. The dual clutch mechanism 116 selectively allows torque transfer between the engine 112 and the gearbox 114.

The gearbox 114 is operatively connected to a final drive 118 (or driveline). The final drive 118 is shown schematically and may include a front or rear differential, or other torque-transmitting mechanism, which eventually provides torque output to one or more wheels (not shown). The final drive 118 may include any known configuration, including front-wheel drive (FWD), rear-wheel drive (RWD), four-wheel drive (4WD), or all-wheel drive (AWD), without altering the description herein.

Only a portion of the powertrain 100 is illustrated in FIG. 1. The lower half (as viewed in FIG. 1) of the powertrain 100 is below a central axis 120, but may be substantially similar to the portions shown. The transfer shafts between the dual clutch mechanism 116 and the engine 112 and gearbox 114 are not shown in FIG. 1. The dual clutch mechanism 116 is housed in a bell housing or bell housing case 122.

The dual clutch mechanism 116 includes a first clutch 132 or clutch one (C1) and a second clutch 134 or clutch two (C2). A center plate 136 (CP) is between the first clutch 132 and the second clutch 134. Each of the first clutch 132 and the second clutch 134 includes friction discs, friction plates, or other friction materials. The center plate 136 contains corresponding friction plates.

A first friction interface 142 is disposed or occurs at the friction plates between the first clutch 132 and the center plate 136. When the dual clutch mechanism 116 is allowing slip (relative difference in rotational speed) and transferring torque between the first clutch 132 and the center plate 136, the first friction interface 142 generates heat. A second friction interface 144 occurs at the friction plates between the second clutch 134 and the center plate 136. When the dual clutch mechanism 116 is allowing slip and transferring torque between the second clutch 134 and the center plate 136, the second friction interface 144 generates heat.

A first pull cover 146 and a second pull cover 148 (PC1 and PC2, respectively) are operatively connected to other components of the dual clutch mechanism 116 and are configured to selectively apply or engage the first clutch 132 and the second clutch 134. The first pull cover 146 and the second pull cover 148 are used to actuate torque transfer of the first clutch 132 and the second clutch 134 in order to selectively control power transfer to the gearbox 114. Some connections between components occur via, for example, bolts or fasteners and some connections are made with straps. The conduction properties of the different connection between components are altered by the type of materials connecting the components and by the area of conduction.

The designation of any specific element or component as "first" or "second" is illustrative and descriptive only. The numerical designations are not intended to be limiting and no requirement of connection should be implied from components having the same numerical designation.

The dry DCT 110, and the dual clutch mechanism 116, may be controlled and monitored by a controller or control system (not shown). The control system may include one or more components with a storage medium and a suitable amount of programmable memory, which are capable of storing and executing one or more algorithms or methods to effect control of the dry DCT 110 or the powertrain 100. Each component of the control system may include distributed controller architecture, such as a microprocessor-based electronic control unit (ECU). Additional modules or processors may be present within the control system. The control system may alternatively be referred to as a transmission control processor (TCM).

The interior chamber of the bell housing case 122 is filled with housing air 150. Depending upon the configuration of the dual clutch mechanism 116 and the thermal model applied used to determine temperatures of the dual clutch mechanism 116, the powertrain 100 may include a housing air temperature sensor 152.

The housing air temperature sensor 152 measures the temperature of air within the bell housing case 122. The powertrain may also include an ambient air temperature sensor 154, an engine coolant temperature sensor 156, and a gearbox oil sensor 158. As used herein, ambient air refers to the air just outside of the bell housing case 122. The sensors may also be measuring or sensing other data. The temperature measurements from these sensors may be used in thermal models to determine the temperatures of the components of the dual clutch mechanism 116.

In the dual clutch mechanism 116, there is a critical temperature of the friction surfaces that carry torque for the first clutch 132 and the second clutch 134. Above this temperature, the components may start to suffer permanent damage. Furthermore, the clutch friction characteristics—i.e., the coefficient of friction and the torque carrying capacity of the first clutch 132 and the second clutch 134—are a function of the temperatures of the first friction interface 142 and the second friction interface 144.

In many configurations of the dry DCT 110, it may be difficult to place a temperature sensor directly on the first clutch 132 and the second clutch 134, and may be impossible to place a temperature sensor near the first friction interface 142 and the second friction interface 144 of the dual clutch mechanism 116. Therefore, the control system uses a thermal model to determine the temperatures of the first clutch 132 and the second clutch 134, to estimate the torque capacity at the first friction interface 142 and the second friction interface 144, and also to provide driver warnings to prevent misuse of the dry DCT 110.

A seven-state thermal model may be used to determine the temperatures of the first clutch 132 and the second clutch 134 for the dry DCT 110. However, in some configurations, a simplified, five-state thermal model may be used instead. The five-state thermal model requires less computational throughput.

When the seven-state thermal model is used, the states (or temperatures) are calculated at: the first clutch 132, the second clutch 134, the center plate 136, the first pull cover 146, the second pull cover 148, the bell housing case 122, and the housing air 150. When the simplified, five-state thermal model is used, the states are reduced to: the first clutch 132, the second clutch 134, the center plate 136, the first pull cover 146, and the second pull cover 148. The five-state thermal model may be used when the temperature of the housing air 150 is known, such as from the inclusion of the housing air temperature sensor 152.

The five-state thermal model will be described first. When either the first clutch 132 or the second clutch 134 is applied, the apply force pushes the corresponding pressure plate of the first clutch 132 or the second clutch 134, squeezing the friction discs against the center plate 136. The dual clutch mechanism 116 is encased in the bell housing case 122, which is assembled between the engine 112 and the gearbox 114. The first clutch 132, the second clutch 134, the center plate 136, the first pull cover 146, and the second pull cover 148 are all masses that conduct heat, and each mass in the system is represented by a single temperature state.

The bell housing case 122 shown in FIG. 1 has no forced cooling and has no vents. However, the models described herein may be changed to incorporate cases with different cooling and airflow. The heat from the masses is transferred by convection to the housing air 150 and from the housing air 150 to the mass of the bell housing case 122. Heat is then convected from the bell housing case 122 to the ambient air just outside of the bell housing case 122.

There is also heat transfer between the bell housing case 122, the engine 112 and the gearbox 114. However, it is assumed that heat from the masses is transferred only to bell housing air 150. Therefore, when the housing air temperature sensor 152 provides known temperature of the housing air 150, the five-state thermal model is configured to use state equations representing the temperature of the masses. The five-state thermal model also assumes that other heat sources, such as the engine 112, the gearbox 114, and the ambient air, will not separately affect the temperature prediction beyond the measured temperature of the housing air 150.

The governing equation describing the heat balance for each individual mass is given by:

$$\text{Mass}_i * Cp_i * dT_i = Q_{i\_in} - Q_{i\_out}$$

where $\text{Mass}_i$ and $Cp_i$ represent the mass and specific heat of the specific component of the dual clutch mechanism 116 under consideration; $Q_{i\_in}$ and $Q_{i\_out}$ represent the heat input and heat output for the mass, respectively; and $dT_i$ is the change in mass temperature with respect to time. All equations described herein are illustrative only and may be modified based upon specific configurations of the powertrain 100, the dry DCT 110, and the dual clutch mechanism 116.

When either the first clutch 132 or the second clutch 134 is applied and torque is transmitted across the clutch, heat is generated at the first friction interface 142 or the second friction interface 144 if the applied clutch is slipping. When there is no slip, the two sides of the clutch are rotating substantially in sync and substantially all power is transferred through the clutch.

Using the first clutch 132 for illustration, the five-state thermal model assumes that the heat generated at first friction interface 142 is absorbed by substantially equally by the first clutch 132 and center plate 136. The temperatures of the first clutch 132 and center plate 136 increase during the slip event, resulting in heat transfer due to conduction and convection to other components in the dual clutch mechanism 116.

Because the equations are similar for all of the masses used in the five-state and the seven-state thermal models, only the equations for the first clutch 132 are illustrated here. The heat power input (Watts) to the first clutch 132 is the product of torque (Nm) and slip speed (rad/s) at the first clutch 132. The heat power integrated over time results in heat (joules).

The slip speed is known or may be determined from measurements or estimates of input speeds and output speeds of the dual clutch mechanism 116 or the dry DCT 110. Similarly, the torque carried by the first clutch 132 is known or determined from torque of the engine 112 or other parameters.

The discrete form of the heating mode of the first clutch 132 is given by:

$$T^h_{c1}(k+1) = T_{c1}(k) + (\tfrac{1}{2}\text{Torque}_{c1} * \omega_{C1\_Slip} * \text{delta\_time}) / (Cp_{c1} * \text{Mass}_{c1})$$

where $C_{pc1}$ is the specific heat of the material of the first clutch 132 and $\text{Mass}_{c1}$ is the mass of the first clutch 132. The term k represents the current time at which the variable (such as temperature of the first clutch 132) is computed or represented and is the instant (or current) time period or loop of the thermal model. The term k+1 represents the next time period, after the lapse of delta_time.

The heat losses due to conduction from the first clutch 132 to the first pulling cover 146 and to the center plate 136 are given by the following expressions:

$$\text{Heatloss\_PC1} = [T_{c1}(k) - T_{pc1}(k)] * \text{Cond} * \text{Area\_PC1}$$

$$\text{Heatloss\_CP} = [T_{c1}(k) - T_{cp}(k)] * \text{Cond} * \text{Area\_CP}$$

where Cond is the thermal conductivity of the connecting material. Area_PC1 and Area_CP are the conducting areas divided by the thickness of the conducting sections. The area/thickness values for each conduction path may be identified by testing and data optimization or by CAD models. These heat losses are subtracted from the heat input due to the slippage at the first friction interface 142.

The cooling of the first clutch 132 due to convection is given by:

$$T^c_{c1}(k+1) = (T_{c1}(k) - T_{housing}(k)) * \exp(-b * \text{delta\_time}) + T_{housing}(k)$$

where $T_{housing}$ is the measured housing air temperature and b is the cooling coefficient for the first clutch 132.

The cooling coefficient is given by:

$$b = h_{c1} * A_{c1} / (Cp_{c1} * \text{Mass}_{c1})$$

where $A_{c1}$ is the surface area of the first clutch 132 that is convecting the heat and $h_a$ is the heat transfer coefficient.

The heat transfer coefficient is calculated using the Nusselt number. The Nusselt number is proportional to the square root of the Reynold's number, with the proportionality constant, $\text{NuReConst}_{c1}$, to be determined from the cooling data for the first clutch 132. The Reynolds number is function of clutch speed, as shown in the equations below:

$$h_{c1} = \text{Nu} * K_{air} / \text{mean\_radius}$$

$$\text{Nu} = \text{NuReConst}_{c1} * \sqrt{\text{Re}}$$

$$\text{Re} = \omega_{c1} * \text{mean\_radius}^2 / (\text{mu}/\text{rho})$$

where mu is the viscosity of air, rho is the density of air, $K_{air}$ is the conductivity in air, and the mean_radius is of the first clutch 132. Similar equations can be derived for the other four masses (the second clutch 134, the center plate 136, the first pull cover 146, and the second pull cover 148) in the dual clutch mechanism 116.

With similar equations for all five of the masses in the dual clutch mechanism 116, the control system determines the operating temperature of any of the individual components due to heating during slip events (usually from gear changes or launches) and cooling during non-slip events (steady state operations). The goal, or target, of the five-state thermal model is to determine the temperature of the first clutch 132 and the second clutch 134. These temperatures may be referred to as the bulk temperatures of the first clutch 132 and the second clutch 134 and represent average temperature throughout the whole mass of the component. From the bulk temperatures, the control system can determine whether the first clutch 132 and the second clutch 134 are below critical temperatures and estimate the torque capacity at the first friction interface 142 and the second friction interface 144.

Some of the inputs and values of the heating and cooling equations may not be easily determined through inspection, reference tables, or CAD models. These inputs and values may be determined through data optimization by comparing testing data of the dual clutch mechanism 116 with pre-optimized simulations. The data is optimized by comparing the simulations with the test data, and the five-state thermal model is developed with more-precise inputs and values for the actual dual clutch mechanism 116 used.

The five-state thermal model is developed to determine temperatures of the first clutch 132 and the second clutch 134 based upon heating events (clutch slipping) and cooling events (periods of non-slipping engagement or non-engagement). The five-state thermal model may be running within the control system at all times, including during vehicle off periods. In such a case, the five-state thermal model tracks all changes to the temperature of the first clutch 132 and the second clutch 134, and the temperatures are accurate absolute temperatures.

However, if the five-state thermal model is not running while the vehicle is turned off or in shut-down mode, the five-state thermal model will actually be determining the changes to temperatures of the first clutch 132 and the second clutch 134. Therefore, the control system may also need to know the initial (starting) temperatures of the first clutch 132 and the second clutch 134 at vehicle start-up in order to determine the absolute temperatures from the temperature changes (delta temperature) determined by the five-state thermal model. Vehicle start-up and vehicle shut-down states may be defined in numerous ways or may be based upon the running state of the engine 112. The initial temperatures may be separately determined by the control system—such as from another model.

The five-state thermal model operates with known temperatures from the housing air 150, such as from the housing air temperature sensor 152. However, it may not always be practical or possible to have the housing air temperature sensor 152 or another mechanism for determining the temperature of the housing air 150. Without known housing air 150 temperatures, the five-state thermal model may be insufficient to determine the temperature of the first clutch 132 and the second clutch 134. Therefore, the non-simplified model, the seven-state thermal model, is used to determine the temperature of the first clutch 132 and the second clutch 134 when the temperature of the housing air 150 is not known or readily determined. Additional temperature states may be incorporated into the five-state and seven-state thermal models illustrated in detail herein.

The seven-state thermal model includes temperature states or nodes for the bell housing case 122 and for the housing air 150 contained therein. The five-state thermal model included only two heat sources, the heat generated during slip events at the first friction interface 142 and the second friction interface 144 of the first clutch 132 and the second clutch 134, respectively. However, the dual clutch mechanism 116 is also in heat-exchange communication with the engine 112, the gearbox 114, and the ambient air outside of the bell housing case 122. The effects of these other heating or cooling sources are actually incorporated into the five-state thermal model through the known temperature of the housing air 150. Since the seven-state thermal model does not include known temperatures of the housing air 150, the heat effects of the engine 112, the gearbox 114, and the ambient air are incorporated into the seven-state thermal model.

When the seven-state thermal model is used, the powertrain 100 is equipped with mechanisms to determine the temperature of the engine 112, the gearbox 114, and the ambient air outside of the bell housing case 122. As illustrated in FIG. 1, the engine coolant temperature sensor 156, the gearbox oil sensor 158, and the ambient air temperature sensor 154 may determine these temperatures for used in the seven-state thermal model. Alternatively, especially for the ambient temperature, other sensors may be used to closely approximate the temperature. For example, a sensor may be located at the air intake for the engine 112, and this temperature may be used as the ambient air temperature for the seven-state thermal model, instead of locating the ambient air temperature sensor 154 just outside of the bell housing case 122.

The two additional temperature states and the three additional heating and cooling sources are replacements in the seven-state thermal model for the known temperature of the housing air 150 in the five-state thermal model. Therefore, the five-state thermal model is a simplified version of the seven-state thermal model. The seven-state thermal model includes only conduction heat transfer with the engine 112 and the gearbox 114, with convection and radiation from those sources assumed to be negligible.

The equations for the housing air 150 temperature and bell housing case 122 case temperature can be written as follows. For the housing air 150:

$$\text{Mass}_h * Cp_h * dT_h = Q_{h\_in} - Q_{h\_out}$$

where subscript h refers to housing air 150 and $dT_h$ is the change in air temperature with respect to time. $Q_{h\_in}$ is the amount of heat convected from the five masses in the dual clutch mechanism 116. The expressions for $Q_{h\_in}$ was given in the description of the five-state thermal model. $Q_{h\_out}$ is the amount of heat convected to the bell housing case 122 and is given by:

$$Q_{h\_out} = h_{air} * \text{Area}_{air}(T_h(k) - T_c(k))$$

where $h_{air}$ and $\text{Area}_{air}$ are heat transfer coefficient and area of convection and these are determined by the parameter optimization.

Similarly, for the bell housing case 122:

$$\text{Mass}_c * Cp_c * dT_c = Q_{c\_in} - Q_{c\_out}$$

where subscript c refers to bell housing case and $dT_c$ is the change in temperature of the bell housing case 122 with respect to time. $Q_{c\_in}$ is the amount of heat convected from housing air 150 ($Q_{h\_out}$, given above) and the heat conducted from the engine 112 and gearbox 114 sides.

Focusing only on the conduction from engine 112 and gearbox 114 to the bell housing case 122, we can write:

$$Q_{eng\_gear} = K_c * \text{Area}_{eng}(T_{eng}(k) - T_c(k)) + K_c * \text{Area}_{gear}(T_{gear}(k) - T_c(k))$$

where $T_{eng}$ is the temperature of the coolant in engine 122, as measured by engine coolant temperature sensor 156, and $T_{gear}$ is the temperature of oil in the gearbox 114, and measured by gearbox oil sensor 158. The areas of conduction, $\text{Area}_{eng}$ and $\text{Area}_{gear}$, may be very complex due to the odd shapes and interfaces of the components. Therefore the areas of conduction may be determined for any specific powertrain 100 by the parameter optimization from test data.

The value $Q_{c\_out}$ is the amount of heat conducted to the ambient air just outside of the bell housing case 122, and is given by:

$$Q_{c\_out} = K_c * \text{Area}_c(T_c(k) - T_{amb}(k))$$

where $\text{Area}_c$ is the area of convection of the bell housing case 122 and may also be determined by the parameter optimization. $T_{amb}(k)$ is the ambient temperature around the bell housing case 122. This temperature might be different from the temperature outside the vehicle. The intake air temperature of the engine 112 may be substituted for the ambient temperature.

Therefore, the convection and conduction for each of the seven components in the seven-state thermal model can be determined. The seven-state thermal model is developed with a lumped parameter approach, where each component is represented by one temperature state. After implementation for the specific vehicle and powertrain 100, the control system uses the seven-state thermal model to determine the bulk temperatures of the first clutch 132 and the second clutch 134.

The seven-state thermal model may not be running while the vehicle is turned off or in shut-down mode, such that the seven-state thermal model is actually determining the changes to temperatures—as opposed to the absolute temperatures—of the first clutch 132 and the second clutch 134. Therefore, the control system may also need to know the initial (starting) temperatures of the first clutch 132 and the second clutch 134 at vehicle start-up in order to determine the absolute temperatures from the temperature changes (delta temperature) determined by the seven-state thermal model.

Figure 2:
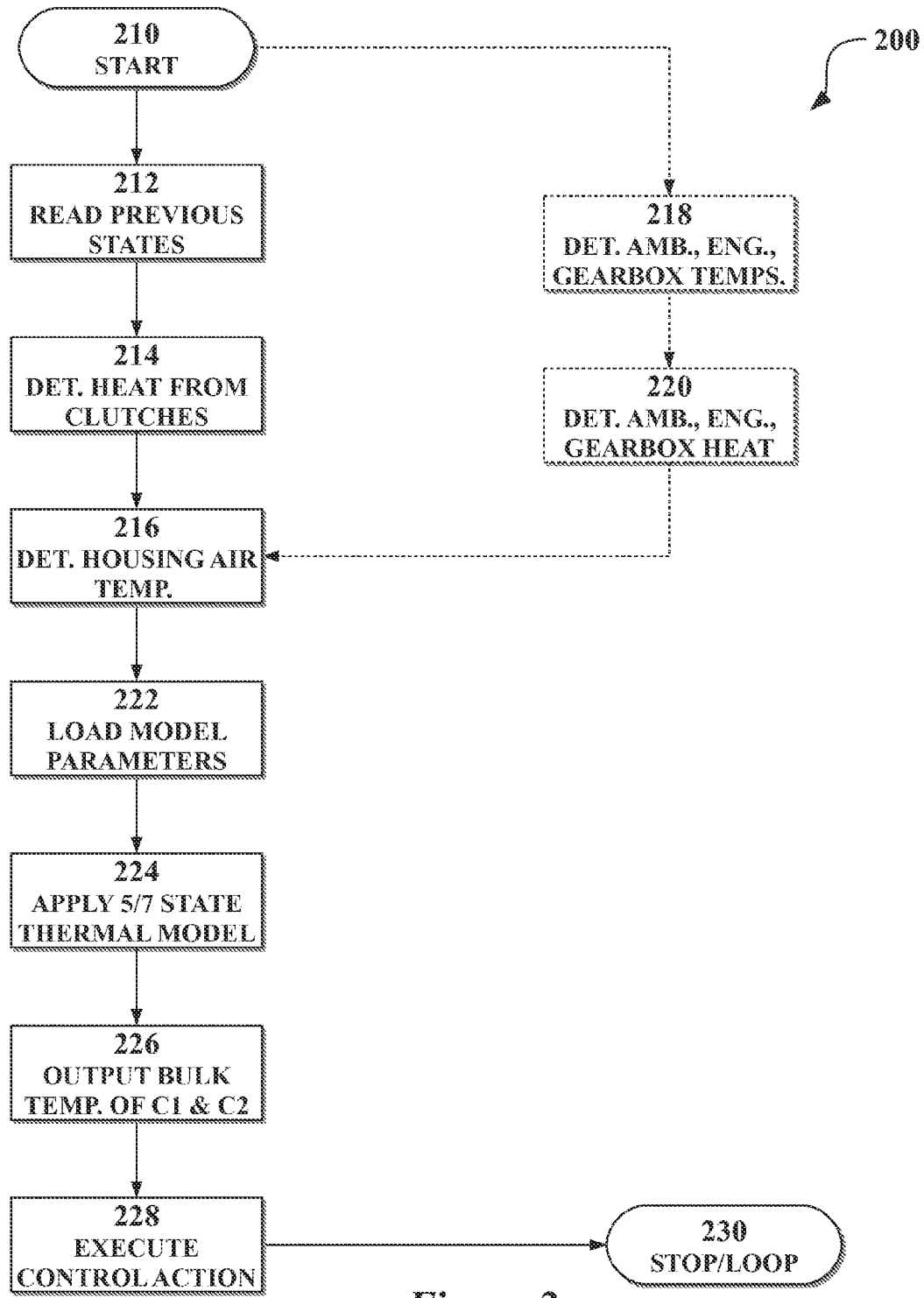
FIG. 2 is a schematic flow chart of a method or algorithm for determining clutch temperatures in a dry dual clutch transmission, such as that shown in FIG. 1.

Referring now to FIG. 2, and with continued reference to FIG. 1, there is shown a schematic flow chart diagram of an algorithm or method 200 for determining clutch temperatures in a dry dual clutch transmission, such as the dry DCT 110 shown in FIG. 1. FIG. 2 shows only a high-level diagram of the method 200. The exact order of the steps of the algorithm or method 200 shown in FIG. 2 is not required. Steps may be reordered, steps may be omitted, and additional steps may be included. Furthermore, the method 200 may be a portion or sub-routine of another algorithm or method.

For illustrative purposes, the method 200 may be described with reference to the elements and components shown and described in relation to FIG. 1 and may be executed by the control system. However, other components may be used to practice the method 200 and the invention defined in the appended claims. Any of the steps may be executed by multiple components within the control system.

Step 210: Start.

The method 200 may begin at a start or initialization step, during which time the method 200 is monitoring operating conditions of the vehicle and of the powertrain 100. Initiation may occur, for example, in response to the vehicle operator inserting the ignition key or in response to other specific conditions being met. The method 200 may be running constantly or looping iteratively whenever the vehicle is in use.

Step 212: Read Previous States (Temperatures).

The method 200 reads the previous five or seven temperature states. The previous states are stored by the control system from the last loop of the method 200. If the method 200 is running for the first time, such as after the engine 112 has just started, the previous states may be replaced by initial conditions of the components. If needed, the initial conditions may be either calculated or estimated by the control system.

Step 214: Determine Heat from Clutches.

The method 200 determines the heat being generated by the clutches. The heat generated is a function of torque capacity and slip speed of the first clutch 132 and the second clutch 134. The heat is generated at the first friction interface 142 and the second friction interface 144.

When neither the first clutch 132 nor the second clutch 134 is slipping, such as during steady state operation, no heat is generated by the clutches. Generally, when no heat is generated by the clutches, the dual clutch mechanism 116 is cooling.

Step 216: Determine Housing Air Temperature.

The method 200 takes the temperature of the housing air 150 into account regardless of the thermal model being used. If the temperature of the housing air 150 is known, such as from the housing air temperature sensor 152, then the five-state thermal model may be used, and the method 200 simply takes the known temperature from the housing air temperature sensor 152. However, if the temperature of the housing air 150 is not known, then method 200 uses the seven-state thermal model instead of directly measuring the temperature of the housing air 150.

Step 218: Determine Ambient, Engine, and Gearbox Temperatures.

If the method 200 is using the seven-state thermal model, steps 218 and 220 are also executed. The method 200 determines or measures the temperatures of the ambient air outside of the bell housing case 122, the engine 112, and the gearbox 114. The ambient air temperature sensor 154, the engine coolant temperature sensor 156, and the gearbox oil sensor 158, respectively, may measure these temperatures. Alternatively, the temperatures may be derived or approximated from other known conditions.

Step 220: Determine Heat from Ambient, Engine, and Gearbox.

The method 200 calculates the heat transfer between the bell housing case 122 and the ambient air outside of the bell housing case 122, the engine 112, and the gearbox 114. Depending upon the relative temperatures involved, heat may be flowing into or out of the bell housing case 122.

Step 222: Load Model Parameters.

The method 200 loads the parameters of the dual clutch mechanism 116 for use with the five-state or seven-state thermal model. The parameters include, without limitation: heat transfer coefficients and other characteristics of the specific materials making up the components, Nusselt and Reynolds numbers for the components experiencing convection, and the areas and thickness of conduction interfaces between components.

Step 224: Apply Five-State or Seven-State Thermal Model.

The method 200 applies one of the thermal models. If the temperature of the housing air 150 is known, the method 200 applies the five-state thermal model and includes temperature states for: the first clutch 132, the second clutch 134, the center plate 136, the first pull cover 146, and the second pull cover 148. When the temperature of the housing air 150 is not known, the method 200 applies the seven-state thermal model and further includes temperature states for the bell housing case 122 and the housing air 150.

Step 226: Output Bulk Temperature of Clutches C1 and C2.

From the thermal model, the method 200 determines the temperatures of the first clutch 132 and the second clutch 134. These temperatures may be the primary goal of the method and of the five-state or seven-state thermal model.

The temperatures of the first clutch 132 and the second clutch 134 may be compared to the critical temperatures for the friction linings of the first clutch 132 and the second clutch 134 and to alert the driver of possible damaging conditions. Furthermore, the temperatures of the first clutch 132 and the second clutch 134 may be used to calculate the coefficient of friction of the first friction interface 142 and the second friction interface 144.

Step 228: Execute Control Action.

The method 200 executes a control action based upon, at least, the determined temperatures of the first clutch 132 and the second clutch 134. Executing the control action may include many tasks or operations.

For example, the control action may include storing all (five or seven) of the determined temperatures. The stored temperatures may be used during the next loop, or may be stored as the last conditions when the vehicle or the engine 112 is turned off.

Executing the control action may include determining the actual coefficient of friction at the first friction interface 142 and the second friction interface 144 based upon the determined temperatures of the first clutch 132 and the second clutch 134. The control action may also include storing the temperatures for calculation of maintenance or service actions and timelines for the first clutch 132 and the second clutch 134 or other portions of the powertrain 100.

Step 230: Stop/Loop.

The method 200 may stop running until called to run again by the control system, such as due to occurrence of events likely to change the temperature of components of the dual clutch mechanisms 116. Alternatively, the method 200 may run with a scheduled number of loops per time segment, such as several times per second.

Figure 3:
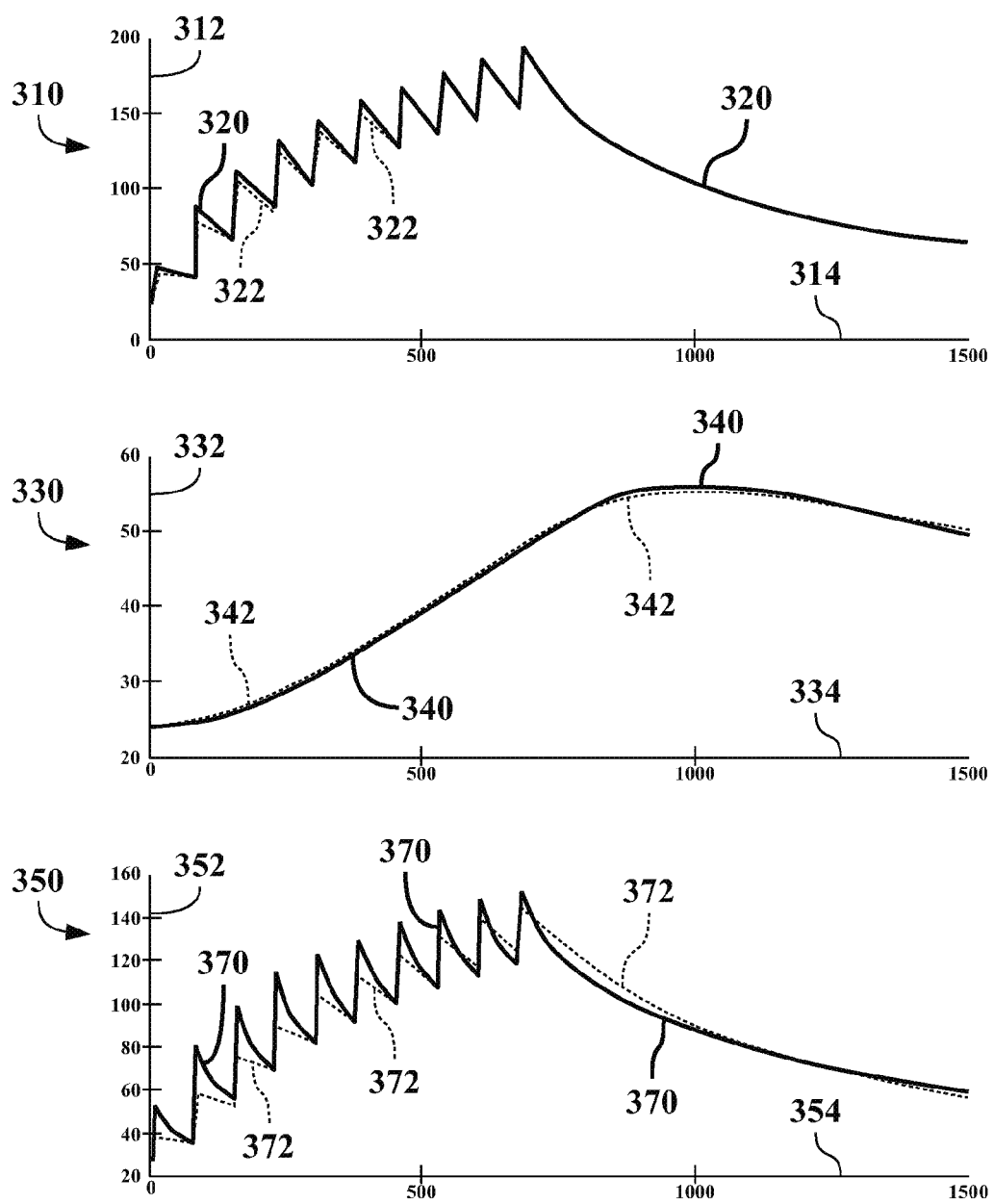
FIG. 3 shows schematic charts or graphs that broadly illustrate testing and validation of a thermal models applied to the dry dual clutch transmission shown in FIG. 1.

Referring now to FIG. 3, and with continued reference to FIGS. 1-2, there are shown schematic charts or graphs that broadly illustrate testing and validation of the thermal models described herein. FIG. 3 shows actual test data compared with actual data from one of the five-state thermal model and the seven-state thermal model (in the description of FIG. 3, both will be referred to generally as the "thermal model"). During the test, the first clutch 132 was used for repeated launches from 0 to 1200 rpm slip speed, and then allowed to cool.

In the test shown in FIG. 3, the temperatures of the first clutch 132, the second clutch 134, and the center plate 136 were actually measured. The results of the thermal model with optimized parameters where also calculated.

A chart 310 shows the temperature of the first clutch 132, with temperature shown on a y-axis 312 and time on an x-axis 314. A measured temperature of the first clutch 132 is shown as a solid line 320. The upward spikes in the line 320 are increases in temperature due to the heat created as the first clutch 132 slips from non-engagement to complete engagement during the launch events. A simulated temperature from the thermal model is shown as a dashed line 322.

A chart 330 shows the temperature of the second clutch 134, with temperature shown on a y-axis 332 and time on an x-axis 334. A measured temperature of the second clutch 134 is shown as a solid line 340. A simulated temperature of the second clutch 134 from the thermal model is shown as a dashed line 342.

A chart 350 shows the temperature of the center plate 136, with temperature shown on a y-axis 352 and time on an x-axis 354. A measured temperature of the center plate 136 is shown as a solid line 370. A simulated temperature of the center plate 136 from the thermal model is shown as a dashed line 372. The upward spikes in the solid line 370 are increases in temperature due to the heat created in the first clutch 132 and passed into the center plate 136 from the first friction interface 142.

As shown in FIG. 3, the thermal model closely predicts the temperatures of the first clutch 132 during the test shown. The thermal model also closely predicts the temperature of the second clutch 134 and the center plate 136.

The detailed description and the drawings or figures are supportive and descriptive of the invention, but the scope of the invention is defined solely by the claims. While the best mode, if known, and other embodiments for carrying out the claimed invention have been described in detail, various alternative designs and embodiments exist for practicing the invention defined in the appended claims.

The invention claimed is:

1. A method of determining temperatures for a dry dual clutch mechanism, comprising:
    determining a first heat input from a first clutch;
    determining a second heat input from a second clutch, which is separated from the first clutch by a center plate;
    determining a housing air temperature of housing air within a bell housing case of the dry dual clutch mechanism;
    applying a thermal model using the determined first heat input and second heat input, wherein the thermal model includes temperature states for the first clutch, the second clutch, and the center plate;
    determining a first clutch temperature from the thermal model;
    determining a second clutch temperature from the thermal model; and
    executing a control action using the determined first clutch temperature and the determined second clutch temperature,
    wherein the control action includes determining a first coefficient of friction from the determined first clutch temperature and determining a second coefficient of friction from the determined second clutch temperature, and includes selectively transferring torque across one of the first clutch and the second clutch.

2. The method of claim 1, wherein the thermal model further includes temperature states for a first pull cover and for a second pull cover, wherein the first pull cover and the second pull cover are configured to selectively engage the first clutch and the second clutch.

3. The method of claim 2, wherein determining the housing air temperature includes measuring the housing air temperature with a housing air sensor disposed within the bell housing case.

4. The method of claim 3, wherein the control action includes storing the determined first clutch temperature and the determined second clutch temperature.

5. The method of claim 4, further comprising:
    determining a center plate temperature from the thermal model;
    determining a first pull cover temperature from the thermal model;
    determining a second pull cover temperature from the thermal model; and
    wherein the control action includes storing the determined center plate temperature, first pull cover temperature, and second pull cover temperature.

6. The method of claim 2, wherein the thermal model further includes temperature states for the housing air and for the bell housing case.

7. The method of claim 6, wherein the method does not include measuring the housing air temperature, and further comprising:
    determining a third heat input from ambient air adjacent the bell housing case;
    determining a fourth heat input from an engine abutting the bell housing case;
    determining a fifth heat input from a gearbox abutting the bell housing case;
    determining an ambient air temperature, an engine temperature, and a gearbox temperature.

8. The method of claim 7, wherein the control action includes storing the determined first clutch temperature and the determined second clutch temperature.

9. The method of claim 7, wherein the control action includes determining a first coefficient of friction from the determined first clutch temperature and determining a second coefficient of friction from the determined second clutch temperature.

10. A method of determining temperatures for a dry dual clutch mechanism, comprising:
    determining a first heat input from a first clutch;
    determining a second heat input from a second clutch, which is separated from the first clutch by a center plate;
    measuring a housing air temperature of housing air with a housing air sensor disposed within a bell housing case of the dry dual clutch mechanism;
    applying a thermal model using the determined first heat input and second heat input, wherein the thermal model includes temperature states for the first clutch, the second clutch, and the center plate;
    determining a first clutch temperature from the thermal model;
    determining a second clutch temperature from the thermal model; and
    executing a control action using the determined first clutch temperature and the determined second clutch temperature,
    wherein the control action includes selectively transferring torque across one of the first clutch and the second clutch.

* * * * *